United States Patent [19]
Iida et al.

[11] 4,020,446
[45] Apr. 26, 1977

[54] ULTRASONIC WAVE TRANSMITTING SYSTEM

[75] Inventors: Masajiro Iida; Hideharu Morimatsu, both of Takarazuka; Itsuo Fukuoka; Yoshinari Yoshida, both of Nishinomiya, all of Japan

[73] Assignee: Furno Electric Company, Limited, Japan

[22] Filed: Sept. 16, 1975

[21] Appl. No.: 613,963

[30] Foreign Application Priority Data

Aug. 13, 1975 Japan ................................ 50-6684

[52] U.S. Cl. ................................ 340/5 R; 340/3 A
[51] Int. Cl.² ........................................... G01S 9/66
[58] Field of Search ............................ 340/3 A, 5 R

[56] References Cited

UNITED STATES PATENTS

| | | | |
|---|---|---|---|
| 3,346,837 | 10/1967 | Pommerening | 340/5 R |
| 3,484,738 | 12/1969 | Autrey | 340/5 R |
| 3,518,669 | 6/1970 | Vogel | 340/5 R X |

FOREIGN PATENTS OR APPLICATIONS

| | | | |
|---|---|---|---|
| 1,330,352 | 9/1973 | United Kingdom | 340/3 A |

*Primary Examiner*—Richard A. Farley
*Attorney, Agent, or Firm*—Eugene E. Geoffrey, Jr.

[57] ABSTRACT

Apparatus for controlling the angular direction of wave transmission of an ultrasonic transmitting system having a plurality of uniformly spaced transducers which includes means for successively shifting the phase of the signals emitted by each transducer and providing means for controlling the magnitude of the phase shift to alter the angle of transmission.

1 Claim, 2 Drawing Figures

ULTRASONIC WAVE TRANSMITTING SYSTEM

Figure 1:
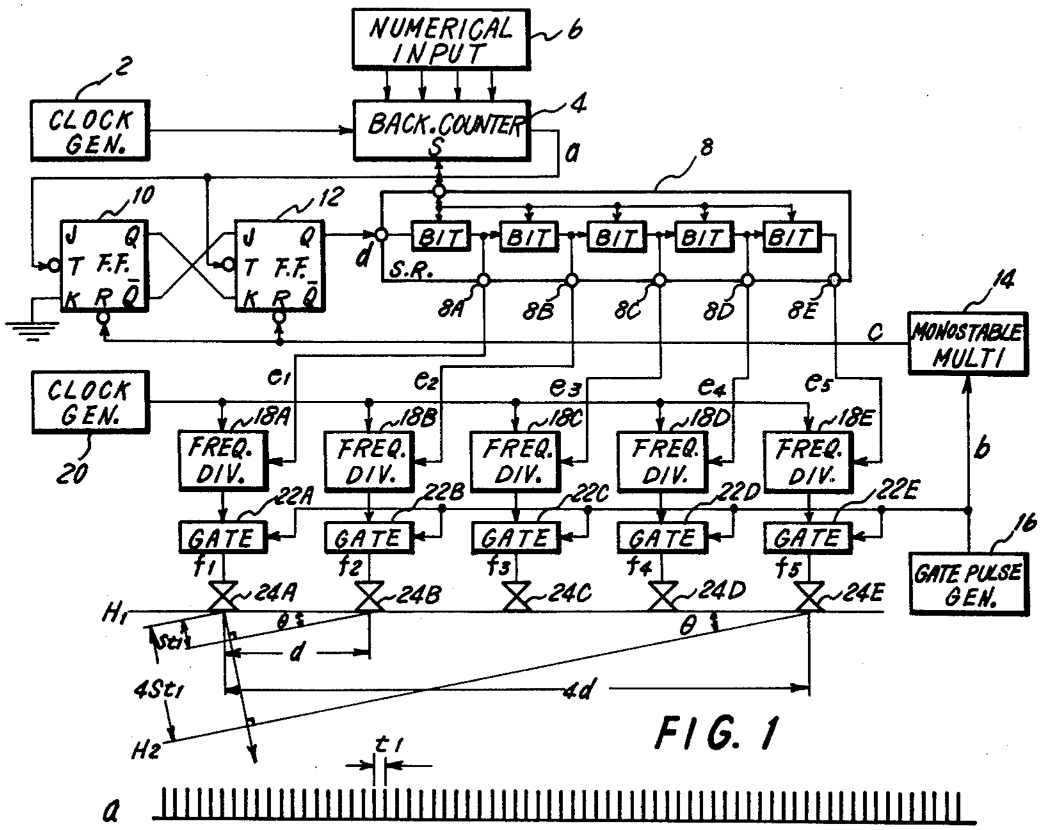

This invention relates to an improved ultrasonic transmitting system having a novel directional angle control device. This invention may be preferably applied to a sonar system.

When a plurality of ultrasonic transducers are arranged on a straight line and driven by their respective driving signals having common frequency and phase, the resultant wavefront becomes parallel to said straight line. However, if the phases of the driving signals are changed in order with respect to the foregoing ones, the resultant wavefront becomes inclined to the straight line and, thus, the directional angle of the ultrasonic wave transmission can be changed.

In order to control the directional angle, it has been proposed to provide each transducer with a phase shifter having a plurality of stages corresponding to the directional angles which are required for switching. However, it is apparent that the device would become large and costly since a number of phase shifters having a number of shifting stages must be installed.

Accordingly, an object of this invention is to provide an improved ultrasonic transmitting system having a novel directional angle control device which has a single phase shifting device for all of the ultrasonic transducers.

According to this invention, the ultrasonic wave transmitting system comprises a plurality of ultrasonic transducers having a common resonance frequency and arranged side by side on a straight line at a fixed interval, a first clock pulse generator for generating a first train of clock pulses having a higher harmonic relationship with said common resonance frequency, a plurality of frequency dividers connected respectively to said ultrasonic transducers for producing ultrasonic wave signals based upon said first train of clock pulses and driving said transducers respectively with said signals, a second clock pulse generator for generating a second train of clock pulse, means for changing the frequency of said second train of clock pulses, and means for resetting said frequency dividers in order one by one at a time interval equal to the period of said second train of clock pulses.

Other objects and features of this invention will be understood more clearly from the following description with reference to the accompanying drawings.

Figure 2:
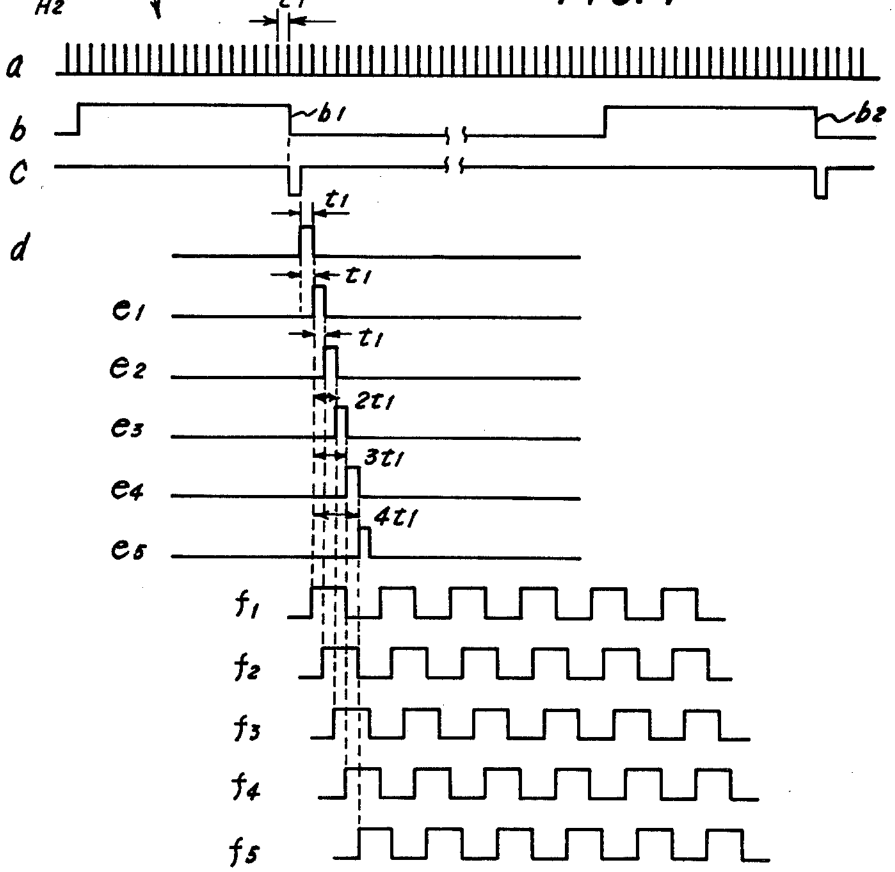

In the drawings:

FIG. 1 is a schematic block diagram representing a circuit configuration of an embodiment of a device according to this invention; and FIG. 2 is a waveform diagram presented as an aid in explaining the operation of the device of FIG. 1.

Referring now to FIG. 1, the device comprises a clock pulse generator 2, a backward counter 4 and a numerical input unit 6, which are interconnected as that the backward counter 4 counts the clock pulses from the pulse generator 2 backwardly from a specific numerical value pre-stored in the input unit 6. The counter 4 is arranged to produce a pulse when the count becomes zero and the output is connected back to the restoration terminal S.

The output of the backward counter 4 in this embodiment of the invention, is also connected to the shift input of a shift register 8 having five bits and five corresponding output terminals 8A, 8B, 8C, 8D, and 8E as well as to the trigger input terminals T of two JK flip-flop circuits 10 and 12. The output terminals Q and Q of the flip-flop 10 are cross-coupled with the input terminals J and K of the flip-flop 12, and the set output terminal Q of the flip-flop 12 is connected to the input terminal of the shift register 8. The input terminal K of the flip-flop 10 is grounded and the input terminal J thereof is floating. The reset terminals R of the both flip-flops 10 and 12 are connected to the output of a monostable multivibrator 14 whose trigger signal is supplied from a gate pulse generator 16.

The output terminals 8A, 8B, 8C, 8D, and 8E of the shift register 8 are respectively connected to the reset terminals of five frequency dividers 18A, 18B, 18C, 18D, and 18E having a common frequency dividing rate. The input terminals of the frequency dividers 18A to 18E are connected in common to the output of a clock pulse generator 20 and the output terminals thereof are connected respectively through five gate circuits 22A, 22B, 22C, 22D, and 22E to five ultrasonic transducers 24A, 24B, 24C, 22D, and 22E which are arranged side by side on a straight line $H_1$ at fixed intervals d as shown in the drawing. The output of the gate pulse generator 16 is connected to the control inputs of the gate circuits 22A and 22E.

Now, the operation of the device of FIG. 1 will be described with reference to the waveform diagram of FIG. 2.

When a specific numerical value is stored in the input unit 6, the backward counter 4 counts the clock pulses from this value towards zero and produces an output pulse when the count becomes zero. This pulse is fed back to the restoration terminal S of the counter 4 to restore the count to the original value, and the same counting operation is repeated. Thus, the counter 4 produces a new train of clock pulses, as shown by FIG. 2 (a), having a period $t_1$. It can be understood that:

$$t_1 = Nt_0 \quad (1)$$

where N is the specific numerical value stored in the input unit 6 and $t_0$ is the period of the clock pulses from the pulse generator 2.

This new train of clock pulses (a) is supplied to the shift input of the shift register 8 and also to the trigger inputs T of the flip-flops 10 and 12. As the outputs Q and Q of the flip-flop 10 are cross-coupled with the inputs J and K of the flip-flop 12, the flip-flop 12 produces from its set output Q a pulse having a duration equal to the period $t_1$ of the clock pulse train (a) everytime it is reset. The reset signal is supplied from the monostable multivibrator 14 under control of the gate pulse generator 16. The gate pulse generator 16 produces a predetermined timing pulse, as shown by FIG. 2 (*b*) which is also used for controlling ultrasonic transmission of the device as described later. The multivibrator 14 is actuated by the trailing edges $b_1$, $b_2$ etc. and produces an output waveform as shown by FIG. 2 (*c*). The flip-flop 12 produces a set output, as shown by FIG. 2 (*d*), in response to the leading edge of the reset signal (*c*).

The pulse (*d*) is supplied to the shift register 8 and shifted successively from the leftmost stage (bit) to the right in the drawing under control of the clock pulse train (a) supplied from the backward counter 4. As being shifted from the first stage (bit) to the last stage (bit) in the shift register 8, the pulse (*d*) appears in order at the output terminals 8A, 8B, 8C, 8D, and 8E with delay times $t_1$. Thus, the outputs from the terminals 8A, 8B, . . . 8E of the shift register 8 become as shown by the waveforms $e_1$, $e_2$, $e_3$, $e_4$ and $e_5$ of FIG. 2. These outputs ($e_1$), ($e_2$), . . . ($e_5$) are respectively supplied to the reset inputs of the frequency dividers 18A, 18B, 18C, 18D, and 18E.

The frequency dividers 18A, 18B, . . . 18E divide the frequency of the clock pulse train supplied from the clock pulse generator 20 by a common divisor to produce new trains of pulses having some waveform and frequency which is the resonance frequency of the ultrasonic transducers 24A, 24B, 24C, 24D, and 24E. However, as the frequency dividers 18A, 18B, . . . 18E are reset respectively by the reset pulses ($e_1$), ($e_2$), . . . ($e_5$), the output pulses of the dividers 18A, 18B, . . . 18E are made coincident in phase with the reset pulses ($e_1$), ($e_2$), . . . ($e_5$), respectively, as shown by the waveforms $f_1$, $f_2$, $f_3$, $f_4$, and $f_5$ of FIG. 2.

Assuming that S is the speed of propagation of ultrasonic waves in the medium in use, the delay distance between the wavefront of two ultrasonic waves emitted from two adjoining transducers is $St_1$, as shown in the lower part of FIG. 1. As the interval between the adjoining transducers is $d$ as aforementioned, the following relation is established if the angle of inclination of the resultant wavefront $H_2$ (FIG. 1) is assumed as $\theta$.

$$St_1 = d \operatorname{Sin} \theta$$

Therfore, $$\theta = \operatorname{Sin}^{-1}(S/d\, t_1) \qquad (2)$$

In other words, the angle of inclination of the waveform, that is, the directional angle of the transmitted ultrasonic wave can be controlled by controlling the period $t_1$ of the clock pulse train (a).

Combining Equation (2) with Equation (1), then:

$$\theta = \operatorname{Sin}^{-1}(S/d\, t_0 N) \qquad (3)$$

This equation indicates that the magnitude of the directional angle of the emitted ultrasonic wave is a function of the numerical value N stored in the input unit 6 and/or the period $t_0$ of the clock pulse train produced from the clock pulse generator 2. However, it is troublesome to determine the values of $t_0$ and N which give a desired value of $\theta$ from this Equation (3). In accordance with this invention, therefore, a method of equalizing the value of $\theta$ in degrees to the numerical value N will now be described.

In case of sonar systems, the directional angle $\theta$ which is most frequency used is 30° to 40° and especially 30°. On the other hand, within such low angle range, the value of Sin $\theta$ can be deemed approximately equal to the value of $\theta$. Accordingly, Equation (3) results as follows.

$$\theta = S/dt_0.N \qquad (4)$$

Thus, the angle $\theta$ becomes proporational to the value N. Assuming now, for example, S = 1500 meters/-second and $d$ = 20 millimeters, the period $t_1$ (=$t_0$N) is calculated as 6.67 microseconds when $\theta$=30°. In order to make the value of N equal to the value of $\theta$ degrees, n must equal 30. Therefore, $$t_0 = t_1/N = 6.67/30 = 0.22 \text{ microsecond}$$

In other words, the value of directional angle $\theta$ in degrees is equal to the value stored in the numerical input unit 6 when the pulse period $t_0$ is previously fixed at 0.22 microsecond. That is, if a numerical value, 15, is stored in the input unit 6, the directional angle of the resultant ultrasonic wave becomes 15° and so on.

Although this procedure has no error in the resultant directional angle at 30°, it produces some error as it departs from 30°. However, it has been ascertained that the maximum error of the directional angle is less han 0.6 degree within the range of 0 to 30°. considering the width or aperture of ultrasonic beam used in practice, such an amount of error is negligible.

The phases of the respective frequency-divided waves of the frequency dividers 18A, 18B, . . . 18E are varied as integral multiples of the period of the clock pulse train produced from the clock pulse generator 20. Therefore, in order to delay the phase of each of the frequency-divided waves in coincidence with the period $t_1$ of the pulse train (a), the period of the clock pulse train send out from the clock pulse generator 20 may be fixed at about 0.1 microsecond in consideration of the period of the clock pulse train from the pulse generator 2.

As the gate pulse (b) is supplied from the gate pulse generator 16 to the gate circuits 24A, 24B, 24C, 24D and 24E, the waveforms ($f_1$), ($f_2$), . . . ($f_5$) which are formed based upon the trailing edge $b_1$ of the waveform ($b$) are respectively supplied to the transducers 24A, 24B, . . . 24E during the duration of the next pulse the trailing edge of which is indicated as $b_2$.

As above described, according to this invention, the directional angle $\theta$ of the emitted ultrasonic wave signal can be easily controlled by merely changing the numerical value stored in the input unit 6.

It should be understood that the above description was made in conjuction with a one embodiment for illustrative purposes only and that various modifications and changes may be made without departing from the scope of the invention as defined by the appended claims. For example, although five ultrasonic transducers are provided in the embodiment of FIG. 1, any number of transducers may be provided, provided that the same number of stages or bits are provided in the shift register 8. Moreover, if the numerical input unit 6 is provided with circuit means for continuously changing the value stored in this unit, the emitting direction of ultrasonic wave beam can be changed continuously.

What is to be claimed:

1. An ultrasonic wave transmitting system, comprising a plurality of ultrasonic transducers having a common resonance frequency and being arranged side by side in a row at fixed intervals, a first clock pulse generator for generating a first train of clock pulses having a higher harmonic relationship with said common frequency, a plurality of frequency dividers having reset inputs respectively, the inputs of said frequency dividers being supplied from said first clock pulse generator and the outputs thereof being connected to said ultrasonic transducers respectively, a second clock pulse generator having frequency control means for generating a second train of clock pulses, and resetting means connected to said second clock pulse generator for resetting said frequency dividers sequentially at a time interval equal to the period of said second train of clock pulses, said resetting means comprising a device for generating a reset signal consisting of a sole pulse, and a shift register having a normal input connected to the output of said reset signal generating device, a shift input connected to the output of said second clock pulse generator and parallel outputs connected respectively to said reset inputs of said frequency dividers.

* * * * *